United States Patent

Wood

Patent Number: 5,286,131
Date of Patent: Feb. 15, 1994

[54] BALL JOINT AND METHOD OF ASSEMBLY

[75] Inventor: Ruey E. Wood, Harrison, Mich.

[73] Assignee: TRW Inc., Lyndhurst, Ohio

[21] Appl. No.: 930,987

[22] Filed: Aug. 17, 1992

[51] Int. Cl.$^5$ .............................................. F16C 11/00
[52] U.S. Cl. .................................... 403/138; 403/140; 403/136; 403/132
[58] Field of Search ............... 403/132, 135, 136, 138, 403/140

[56] References Cited

U.S. PATENT DOCUMENTS 4,057,355 11/1977 Allison .
5,022,779 6/1991 Schnitzler .
5,066,160 11/1991 Wood .
5,067,841 11/1991 Fukukawa .

Primary Examiner—Ramon S. Britts
Assistant Examiner—Christopher J. Novosad
Attorney, Agent, or Firm—Tarolli, Sundheim & Covell

[57] ABSTRACT

A ball joint has a stud with a ball end disposed in a housing in abutting engagement with an improved bearing. The bearing has a plurality of segments disposed in a circular array. A plurality of flexible connector sections interconnect the segments. As originally formed, the bearing has generally cylindrical outer side surface with a diameter which is less than the diameter of an inner side surface of the housing. This facilitates insertion of the bearing into the housing during assembly of the ball joint. The ball end of the stud applies force against a circular array of bearing segments to expand the circular array of bearing segments outwardly into engagement with the inner side surface of the housing. The bearing segments are interconnected by flexible connector sections which are deflected, as the bearing segments move outwardly, to accommodate expansion of the circular array of bearing segments.

9 Claims, 2 Drawing Sheets

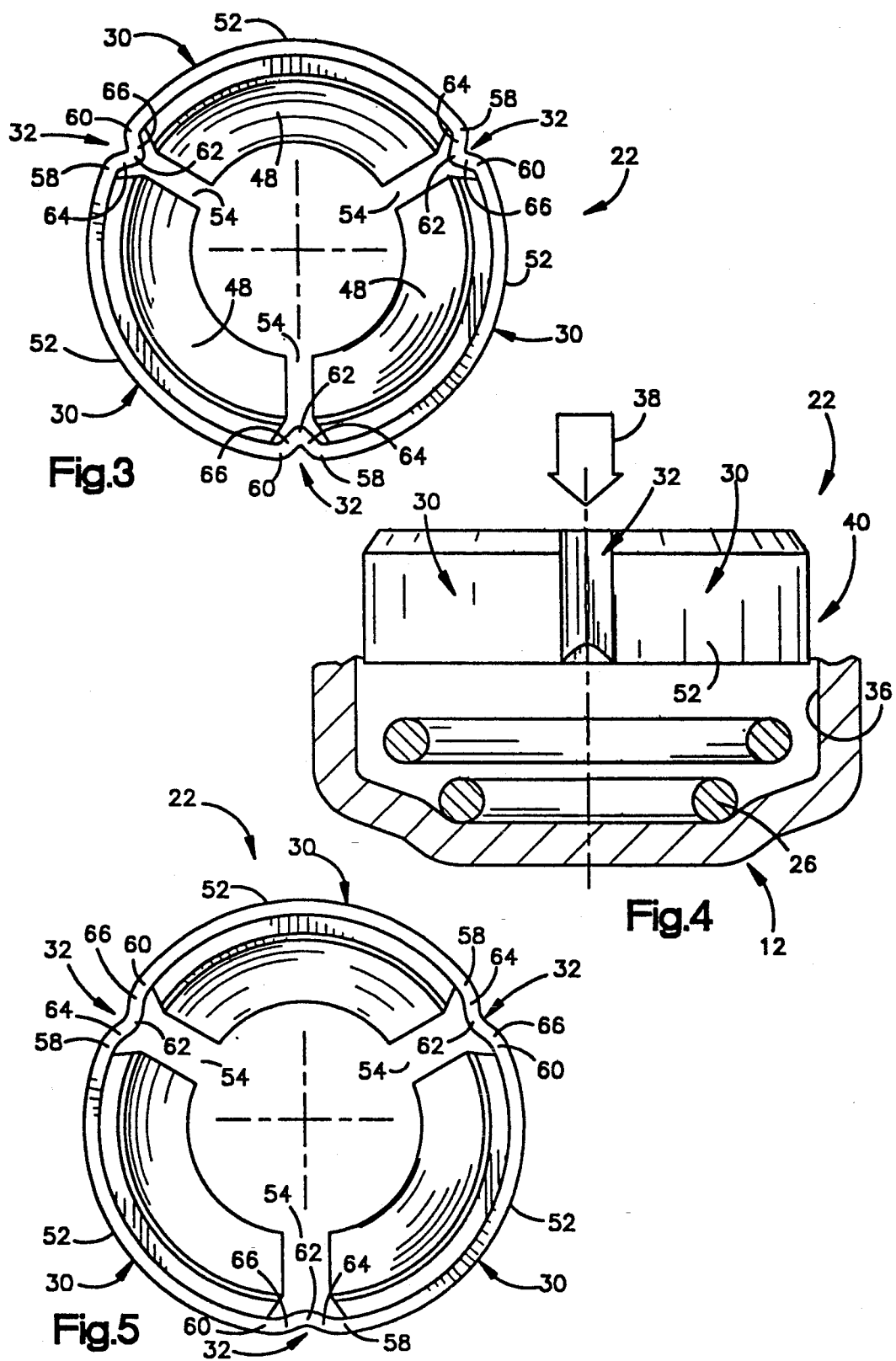

BALL JOINT AND METHOD OF ASSEMBLY

FIELD OF THE INVENTION

The present invention relates to a ball joint and method of assembling the ball joint. More specifically, the invention relates to a ball joint having an improved bearing which engages a ball end of a stud.

BACKGROUND OF THE INVENTION

Ball joints generally comprise a stud which includes a shank and a ball end, and a housing in which the ball end is seated. The ball joint permits the ball end and shank to rotate about the stud axis, as well as to swing or pivot with respect to the stud axis. The housing usually contains a pair of bearings. The bearings have spherical surfaces and ar positioned within the housing in axially opposed relationship to provide bearing surfaces against which the surface of the ball end of the stud can slide. A spring biases one of the bearings against the ball end of the stud to hold the ball end firmly between bearings.

In order to minimize production costs, there are usually tolerances which produce clearances between the outside of the bearings and an inner side surface of the housing which encloses the ball end of the stud. A bearing is normally molded with a slot through one side of the bearing to enable the bearing to be firmly pressed against the ball stud. The presence of the slot allows the bearing to spread open and makes it impossible to consistently control the size of the outside diameter of the as molded bearing. This results in the bearings having random oversize conditions which can cause assembly problems.

SUMMARY OF THE INVENTION

In accordance with a preferred embodiment of the invention, a ball joint comprises a stud member having a generally spherical ball end and a shank extending from the ball end. A housing encloses the ball end of the stud. A bearing is disposed in the housing in engagement with the ball end of the stud.

The bearing has a plurality of segments disposed in a circular array with a plurality of flexible connector sections interconnecting the segments. The connector sections accommodate expansion of the circular array of segments. This enables the bearing to be originally formed with a generally cylindrical outer side which has a smaller diameter than a cylindrical inner side surface of the housing so that the bearing can be readily inserted into the housing. When the ball end of the stud is pressed against the bearing, the connector sections flex and the circular array of bearing segments expands radially outwardly into tight abutting engagement with a cylindrical inner side surface of the ball joint housing.

BRIEF DESCRIPTION OF THE DRAWINGS

These and other features of the present invention will become more apparent to those skilled in the art upon reading the following description of a preferred embodiment in view of the accompanying drawings, wherein:

FIG. 3 is a plan view, taken along the line 3—3 of FIG. 2, illustrating the manner in which a circular array of bearing segments is interconnected by flexible connector sections;

FIG. 4 is a schematicized illustration depicting the manner in which the bearing of FIG. 3 is inserted into the housing of the ball joint; and FIG. 5 is a plan view, generally similar to FIG. 3, illustrating the bearing after it has been expanded by the ball end of the stud.

DESCRIPTION OF A PREFERRED EMBODIMENT

Figure 1:
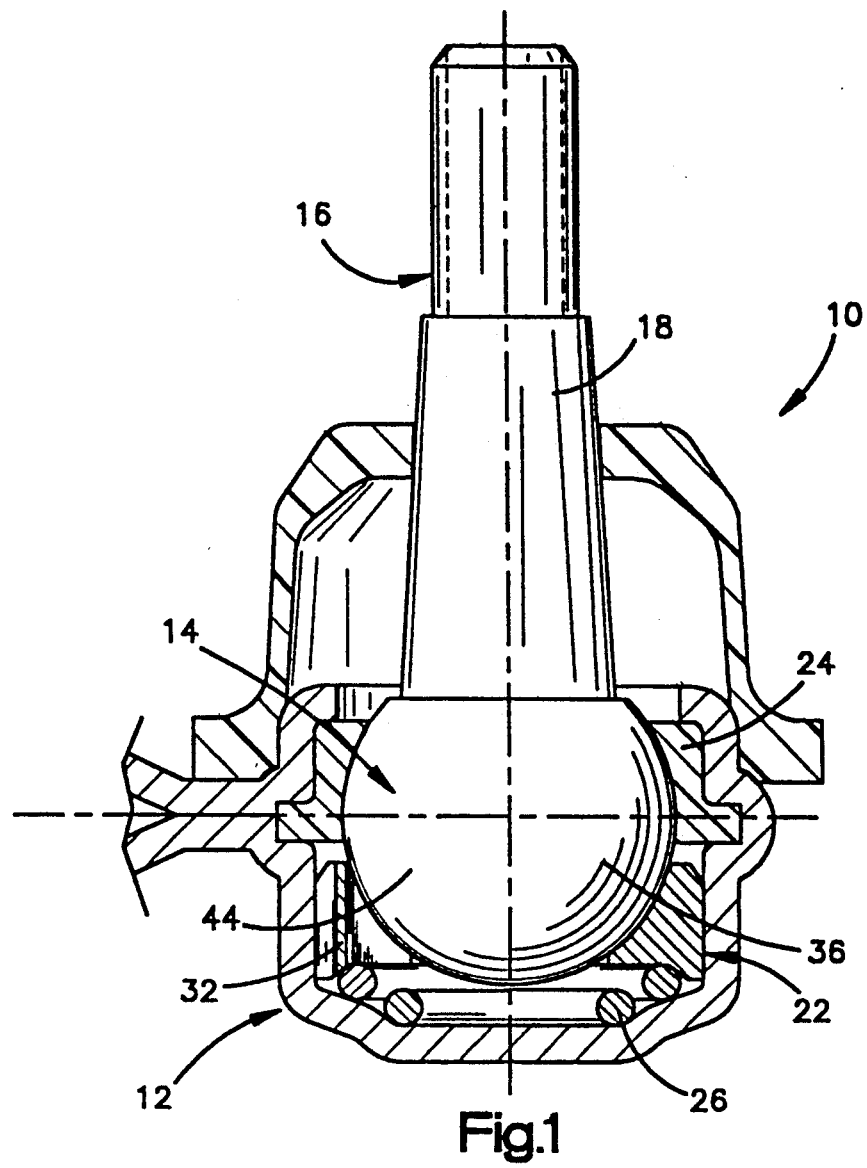
FIG. 1 is a cross sectional view of a ball joint constructed in accordance with the present invention.

A ball joint 10, constructed in accordance with the present invention, is illustrated in FIG. 1. The ball joint 10 includes a metal housing 12 which encloses a ball end 14 of a metal stud 16. The stud 16 has a shank 18 which extends from the ball end 14.

An improved bearing 22 is disposed in the housing 12 in engagement with the ball end 14 of the stud 16. A second bearing 24 is disposed in the housing 12 and engages the opposite side of the ball end 14 of the stud 16. A coil spring 26 presses the bearing 22 against the ball end 14 of the stud 16 and presses the ball end of the stud against the second bearing 24. The general construction of the ball joint 10 is the same as is disclosed in U.S. Pat. No. 5,066,160. Also, the housing 12, stud 16, bearing 24 and spring 26 are the same as corresponding parts of a joint sold by The Steering and Suspension Systems Division of TRW Inc., of Sterling Heights, Mich. under part No. G-26-SV-7018-A-11.

The bearing 22 includes a plurality of bearing segments 30 (FIGS. 2 and 3) which are disposed in a circular array. In accordance with a feature of the invention, the bearing segments 30 are interconnected by flexible connector sections 32. The flexible connector sections 32 (FIG. 3) accommodate expansion of the circular array of bearing segments.

As originally molded as one-piece of a Nylon or Delrin ® type polymeric material, the bearing 22 has a generally cylindrical configuration with an outside diameter which is smaller than the diameter of a cylindrical inner side surface 36 (FIG. 4) of the housing 12. This enables the bearing 22 to be readily inserted into the housing 12. Thus, as the bearing 22 is inserted into the housing 12, in the manner indicated schematically by an arrow 38 in FIG. 4, there is substantial clearance between a generally cylindrical outer side surface 40 of the bearing 22 and the inner side surface 36 of the housing 12.

After the stud 16 and bearing 24 (FIG. 1) have been inserted into the housing, force is applied to the stud 16 to press the ball end 14 of the stud against the bearing 22 and the coil spring 26. The housing 12 is then deformed around the bearing 24 t hold the stud 16 and bearing in the housing.

As axial force is applied against the stud 16 to press the stud against the bearing 22, force is applied by a spherical outer surface 44 of the ball end 14 against arcuate surfaces 48 (FIG. 3) formed on the bearing 22. The force applied against the arcuate surfaces 48 on the bearing 22 press the bearing segments 30 outwardly to radially expand the circular array of bearing segments from the relatively small, as formed size shown in FIG. 3 to the relatively large size shown in FIG. 5. As the circular array of bearing segments 30 is expanded radially outwardly, an arcuate outer side surface 52 on each of the bearing segments 30 is firmly pressed against the inner side surface 36 of the housing 12.

As the bearing segments 30 are forced outwardly into engagement with the housing 12 by the ball end 14 of the stud 16, the connector sections 32 are flexed. Flexing of the connector sections 32 allows the bearing segments 30 to move outwardly. Even though the flexible connector sections 32 allow the bearing segments 30 to move, the connector sections interconnect the bearing segments to maintain substantially uniform slots 54 between the bearing segments. Of course, as the circular array of bearing segments 30 is expanded radially outwardly from the original size shown in FIG. 3 to the size shown in FIG. 5, the slots 54 become wider.

The connector sections 32 have a generally V-shaped cross sectional configuration as viewed in a plane extending perpendicular to a central axis of the bearing 22 (FIG. 3). Opposite end portions 58 and 60 of a V-shaped connector section 32 are connected with end portions of adjacent bearing segments 30. Each of the V-shaped connector sections 32 has a bend 62 which interconnects opposite side portions 64 and 66 of the connector section 32. Each of the bends 62 is disposed between adjacent bearing segments 30 in one of the slots 54.

As the bearing segments 30 are forced radially outwardly into engagement with the inner side surface 36 of the housing 12, the connector sections 32 are flexed at the bends 62. As the connector sections 32 are flexed at the bends 62, the side portions 64 and 66 move radially outwardly relative to the circular array of bearing segments from the positions shown in FIG. 3 to the positions shown in FIG. 5. As this occurs, the bends 62 become less pronounced and also move radially outwardly relative to the circular array of bearing segments 30. The material forming the connector sections 32 can be elastically flexed without breaking so that the connector sections 32 continue to interconnect the bearing segments 30 and position the bearing segments relative to each other after the ball joint 10 (FIG. 1) has been assembled.

Figure 2:
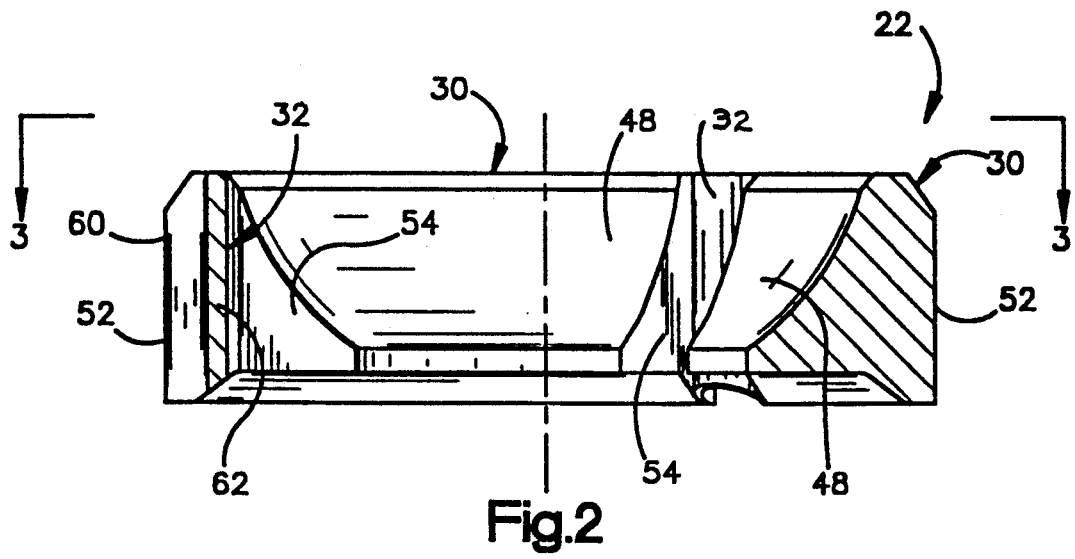
FIG. 2 is an enlarged sectional view of an improved bearing used in the ball joint of FIG. 1, the bearing being shown in an as formed condition prior to being inserted into the housing of the ball joint.

The connector sections 32 have an axial extent which is the same as the axial extent of the bearing 22 (FIG. 2). Thus, the end portions 58 and 60 (FIG. 3) of the connector sections 32 extend along the ends of the bearing segments 30 throughout the axial extent of the bearing segments. Therefore, the axial extent of the connector sections is greater than the axial extent of the arcuate surfaces 48 against which the ball end 14 of the stud 16 applies pressure. The arcuate surfaces 48 formed on the bearing segments 30 are formed as portions of a sphere having the same diameter as the spherical surface 44 of the ball end 14 of the stud 16. This enables the stud 16 to press firmly against the arcuate inner side surfaces 48 on the bearing segments 30 to move them radially outwardly into engagement with the inner side surface 36 of the housing 12.

In the illustrated embodiment of the invention, the bearing segments 30 have been shown with outer side surfaces 52 which, when the bearing is in its originally molded configuration (FIG. 3), form part of a cylinder. Therefore, when the circular array of bearing segments 30 is expanded radially outwardly, the array has a slightly scalloped configuration. The outer side surfaces 52 of the bearing segments 30 will not be in precise abutting engagement with the cylindrical inner side surface 36 of the housing 12.

To provide for precise abutting engagement of the outer side surfaces 52 of the bearing segments 30 with the inner side surface 36 of the housing 12, the bearing segments could be formed with outer side surfaces 52 which form part of a cylinder when the bearing 22 is in the expanded condition of FIG. 5. If this was done, the bearing 22 would not have a truly cylindrical configuration when the bearing is in the as molded condition of FIG. 3.

In the illustrated embodiment of the invention, the construction of the bearing 24 (FIG. 1) is different than the construction of the bearing 22. However, it is contemplated that the bearing 24 could have the same construction as the bearing 22 if desired.

From the above description of the invention, those skilled in the art will perceive improvements, changes and modifications. Such improvements, changes and modifications within the skill of the art are intended to be covered by the appended claims.

Having described the invention, the following is claimed:

1. In a ball joint having:
   a stud having a ball end and a shank extending from said ball end;
   a housing at least partially enclosing said ball end of said stud,
   a bearing disposed in said housing in engagement with said ball end of said stud,
   the improvement comprising said bearing having a plurality of segments disposed in a circular array and a plurality of flexible connector sections interconnecting said segments and accommodating radial outward movement of said segments in their entirety to expand the circular array of segments radially outward to engage an inner side surface of said housing under the influence of force applied against said segments by said ball end of said stud.

2. A ball joint as set forth in claim 1 wherein the inner side surface of said housing has a generally cylindrical configuration, said bearing being formed as one-piece with an outer side having a generally cylindrical configuration, said outer side of said bearing having an as formed diameter which is less than the diameter of the inner side surface of said housing to facilitate insertion of said bearing into said housing.

3. A ball joint as set forth in claim 2 wherein said ball end of said stud applies radially outwardly directed forces against said circular array of said bearing segments to flex said connector sections and move said segments outwardly into engagement with the inner side surface of said housing.

4. A method of forming a ball joint, said method comprising the steps of:
   forming a bearing having a plurality of segments disposed in a circular array with a plurality of flexible connector sections interconnecting the segments;
   inserting the bearing into a ball joint housing having a cylindrical inner side surface with a diameter which is greater than the diameter of the circular array of segments; and
   pressing a ball end of the stud against the segments to flex the connector sections and to radially move the segments in their entirety radially outward into tight abutting engagement with the cylindrical inner side surface of the ball joint housing.

5. In a ball joint having:

a stud having a ball end and a shank extending from said ball end;

a housing at least partially enclosing said ball end of said stud; and a bearing disposed in said housing in engagement with said ball end of said stud, the improvement comprising said bearing having a plurality of segments disposed in a circular array and a plurality of flexible connector sections interconnecting said segments and accommodating expansion of the circular array of segments to engage an inner side surface of said housing under the influence of force applied against said segments by said ball end of said stud, each of said flexible connector sections having a bend which is deflected upon expansion of the circular array of segments.

6. In a ball joint having:

a stud having a ball end and a shank extending from said ball end;

a housing at least partially enclosing said ball end of said stud; and a bearing disposed in said housing in engagement with said ball end of said stud, the improvement comprising said bearing having a plurality of segments disposed in a circular array and a plurality of flexible connector sections interconnecting said segments and accommodating expansion of the circular array of segments to engage an inner side surface of said housing under the influence of force applied against said segments by said ball end of said stud, each of said segments having an arcuate side surface area which forms a portion of a sphere and is disposed in engagement with said ball end of said stud, each of said connector sections having opposite end portions connected with a pair of adjacent segments, each of said end portions of a connector section having a length parallel to central axis of said circular array of segments which is at least as great as the axial extent of the arcuate side surface areas formed on said segments.

7. In a ball joint having:

a stud having a ball end and a shank extending from said ball end;

a housing at least partially enclosing said ball end of said stud; and a bearing disposed in said housing in engagement with said ball end of said stud, the improvement comprising said bearing having a plurality of segments disposed in a circular array and a plurality of flexible connector sections interconnecting said segments and accommodating expansion of the circular array of segments to engage an inner side surface of said housing under the influence of force applied against said segments by said ball end of said stud, each of said flexible connector sections having a generally V-shaped cross-sectional configuration as viewed in a plane extending perpendicular to a central axis of the circular array of segments with an apex portion of the flexible connector section disposed between adjacent segments.

8. A method of forming a ball joint, said method comprising the steps of:

forming a bearing having a plurality of segments disposed in a circular array with a plurality of flexible connector sections interconnecting the segments;

inserting the bearing into a ball joint housing having a cylindrical inner side surface with a diameter which is greater than the diameter of the circular array of segments;

pressing a ball end of a stud against the segments to flex the connector sections and expand the circular array of segments radially outwardly into tight abutting engagement with the cylindrical inner side surface of the ball joint housing; and flexing the connector sections at bends formed in central portions of the connector sections.

9. A method as set forth in claim 8 wherein said step of flexing the connector sections includes moving the bends in the connector sections radially outward relative to the array of segments.

* * * * *